United States Patent Office 3,328,479
Patented June 27, 1967

3,328,479
PURIFYING DIOLEFINS BY SELECTIVE
HYDROGENATION AND DISTILLATION
Frederick H. Schneider, Beaumont, Tex., and Claude D. Birkhead, Palo Alto, Calif., assignors to Mobil Oil Corporation, a corporation of New York
No Drawing. Filed Oct. 4, 1965, Ser. No. 492,859
2 Claims. (Cl. 260—681.5)

The present invention relates to the purification of diolefin streams contaminated with acetylenic hydrocarbons by a process involving the combination of a mild and highly selective hydrogenation over a specific type of catalyst to convert a portion of said contaminants and a prior or subsequent fractional distillation operation to eliminate another portion thereof.

The commercial grade of 1,3-butadiene produced from petroleum or petrochemical sources by pyrolysis or catalysis usually contains minor but significant amounts of acetylenic material including acetylene, methylacetylene, dimethylacetylene, ethylacetylene, and vinylacetylene as impurities. Such contaminants may range up to a content of one or two percent by weight, and the $C_4$-acetylenes are particularly objectionable, since they consume polymerization catalyst in polybutadiene operations. A variety of techniques for purifying 1,3-butadiene have been proposed including selective catalytic hydrogenation in both liquid and vapor phases, solvent extraction, selective adsorption, etc. Nevertheless, the current average $C_4$-acetylene level in commercial butadiene is about 200 parts per million by weight (p.p.m.), but the demand for acetylene-free material is gaining impetus because of the expanding cis-polybutadiene market. Accordingly, there is considerable interest in the development of economical techniques for the substantial elimination of acetylenic hydrocarbons from diolefin streams.

Broadly, the present invention concerns a process which comprises purifying a hydrocarbon mixture containing a substantial proportion of a diolefin and a minor proportion of acetylenic material by steps including selective hydrogenation in the vapor phase under mild reaction conditions in the presence of hydrogen and a catalyst comprising a deposit of palladium metal on an oxidized copper and chromium base to eliminate a major proportion of the acetylenic material present by at least partial saturation of the triple bond therein without substantial conversion of said diolefin in combinaion with a fractional distillation step in which a major proportion of said diolefin is withdrawn in a stream and a major proportion of the acetylenic material present is eliminated by separate withdrawal in at least one other stream without substantial loss of said diolefin.

Narrower aspects of the invention relate to controlling the severity of hydrogenation and regulating the distillation to procure a highly purified product with a minimum loss of charge stock. The reaction severity during said hydrogenation is controlled to convert about 90 to 99% by weight (preferably at least 95% in some instances) of said acetylenic hydrocarbons while retaining at least about 99% (preferably at least 99.5%) of said diolefin by adjusting the reaction temperature within the range of about 100 to 350° F. (preferably about 125 to 250°), the molar charging ratio of hydrogen to acetylenic hydrocarbons within the range of about 2:1 to 20:1 (preferably about 4:1 to 12:1), and the volumetric hourly vapor space velocity within the range of about 100 to 900 (preferably about 250 to 750). The aforesaid fractional distillation is regulated to remove at least about 90% of said acetylenic material present in the distillation charge while separately recovering at least about 99.5% of said diolefin therein, preferably as a product stream of at least 99% purity. All proportions herein are expressed in terms of weight and all temperatures as degrees Fahrenheit unless otherwise stated.

Still other aspects of the invention relate to such features as the content of palladium on the catalyst composite, the purification of conjugated diolefins, and particularly the treatment of a mixture containing a major proportion of 1,3-butadiene and a minor proportion (preferably less than about 2% by weight) of substituted acetylenes contaning 4 carbon atoms.

A highly selective but relatively mild hydrogenation is involved here, and the severity of hydrogenation may be readily controlled in numerous ways by adjusting one or more of the reaction conditions by increasing or decreasing temperature, hydrogen charging ratio, and space velocity within the aforesaid ranges. It is often not necessary, and sometimes not even desirable, to convert the maximum possible amount of acetylenic hydrocarbons in the hydrogen treatment in view of the cumulative purifying effect of the fractional distillation; hence a less severe hydrogenation can often be employed which may provide one or more of such advantages as a smaller loss of charge stock, less hydrogen consumption, lower reaction temperature, and higher throughput or longer catalyst life.

The instant hydrogenation step is particularly intended for continuous, regenerative, vapor phase operations of a simple and relativelp inexpensive nature. By suitable adjustment of the conditions determining reaction severity, it is possible to obtain high conversions of acetylenic material, very small losses of the diolefin, and/or high throughputs as the process is quite flexible.

The hydrogenation reaction is performed in the vapor phase; therefore, the feed should be vaporizable at the selected reaction temperature or any high boiling materials should be separated from the preheated feed prior to its introduction into the catalytic reactor. This hydrogen treatment is suitable for the conversion of acetylene and substituted acetylenes as contaminants in hydrocarbon streams in general. It is well suited by reason of its high selectivity for streams containing substantial proportions of diolefins and olefins, such as butadiene, propadiene, ethylene, propylene, and the various butenes plus the acetylenic impurities. The new process is particularly adaptable to the treatment of streams containing major proportions of 1,3-butadiene contaminated with minor amounts of vinylacetylene, ethylacetylene, and dimethylacetylene ranging up to a total of about 2% by weight, since a very high selectivity is needed to hydrogenate most of such acetylenic hydrocarbons without simultaneously hydrogenating the also highly reactive butadiene especially where the concentration of the former is low and the concentration of butadiene is high.

The hydrocarbon charge is desirably free of oxygen or air to avoid the formation of peroxides and also dimerization; and this may be readily accomplished by utilizing nitrogen, methane, hydrogen or another gas under pressure as a blanket over any charge material which is stored in the liquid state. Such gas should, of course, be inert or nonreactive under the storage conditions.

The catalyst utilized in the instant process is a composite of oxidized copper and chromium in particle form (e.g., $\frac{1}{8}$ or $\frac{3}{16}$ inch granules or pellets) having palladium metal deposited essentially on the surface thereof. The catalyst base may be a simple mixture of preformed copper and chromium oxides, or oxidized material obtained by the coprecipitation of chromium and copper compounds from solutions thereof and ignition of the precipitate; or it may be copper chromite alone or mixtures of one or more oxides of copper and chromium with copper chromite or perhaps another copper-chromium-oxygen complex. Several methods of preparing copper-chromium-oxide hydrogenation catalysts of types suitable for use as components of the present catalyst combinations are detailed or mentioned in Organic Synthesis, Collective Vol. 2, pp. 142–145, John Wiley & Sons, N.Y. (1943).

In view of the plural valences of both copper and chromium, many oxide complexes are possible; moreover, the catalyst is used in a reducing atmosphere wherein it is not possible to determine the degree of oxidation of various components of the catalyst under operating conditions. Accordingly, the catalyst base may be described as comprising at least a major proportion of copper, chromium and oxygen in combined form wherein the copper and chromium are desirably present in weight ratios between about 22:78 and 73:27, respectively, on a metal basis. Suitable known refractory binders, such as siliceous materials, may be utilized in preparing preformed pellets or tablets of the oxidized copper and chromium support.

In completing the formation of the catalyst, the aforesaid base may be impregnated with a solution of a palladium salt, such as the chloride or nitrate salt, in suitable concentration for depositing a concentration of the palladium compound corresponding to about 0.01% up to 5% of palladium thereon (about 0.1 to 1.0% is generally preferable); then the impregnated material is calcined at temperatures of the order of about 950 to 1200° F. to drive off water and decompose the palladium salt leaving metallic palladium deposited chiefly on the surface of the oxidized material. The resulting catalyst has mild but highly selective hydrogenation characteristics, and the reaction conditions may be readily regulated to minimize the limited tendency to convert butadiene into butenes despite the high activity it shows in converting acetylenic hydrocarbons, as exemplified by hydrogenating $C_4$-acetylenes into butadienes or butenes.

After a prolonged period of operation, the activity of the catalyst drops off to the extent where regeneration is desirable. Such regeneration may be accomplished by heating the catalyst bed to a temperature of 400 to 600° F. with steam, then introducing a small amount of air with the steam and gradually increasing the proportion of air up to about 7 volume percent while maintaining a temperature below 700° F. for about 10 to 16 hours to oxidize the catalyst. After oxidation, the catalyst is reduced by shutting off the air and introducing 5 percent hydrogen into the steam for 4 to 8 hours or until the heat front is dissipated; then the hydrogen admission is increased to 10% for another 4 hours. A shorter regeneration period is adequate when the catalyst is regenerated after only partial deactivation in service.

The reaction temperature is an important factor in adjusting the hydrogenation severity. For converting acetylenic hydrocarbons over oxidized copper and chromium surface impregnated with palladium, the temperature in the catalyst bed may be maintained between about 100 and 350° F., and it is generally preferred to hold the average bed temperature within the range of about 125 to 250° F. The minimum temperature may be described as the lowest temperature capable of producing a satisfactory percentage conversion of acetylenic hydrocarbons. In prolonged operations, it may be desirable to gradually raise the reaction temperature to compensate for gradual deactivation of the catalyst mass. In general, it is preferable to operate with as low an average reaction temperature as will permit an acceptable throughput of hydrocarbons.

Inasmuch as the reaction pressure does not appear to be critical, a pressure near atmospheric pressure is commonly employed.

The optimum mol ratio of hydrogen to acetylenic hydrocarbons is the lowest that is required to complete the desired reaction. Too high a molar ratio converts butadiene to butenes, while too low a ratio allows an excessive amount of acetylenic material to pass through unreacted. That is, an increase in the proportion of hydrogen charged increases the reaction severity and vice-versa. With due consideration for the other reaction conditions, the hydrogen:acetylenic hydrocarbons mol ratio may be as low as about 2:1 or as high as about 20:1, but it is usually preferable to maintain this ratio at a constant value within the range of about 4:1 to 12:1.

Space velocity is another processing condition determinative of the reaction severity, as a decrease in the hydrocarbon throughput increases the severity of hydrogenation and vice-versa. For maximum utilization of equipment, the optimum space velocity for any given material is the highest which will permit sufficient reaction time for conversion of an acceptable percentage of the acetylenic hydrocarbons. Too low a space velocity is not only uneconomical from a production standpoint but also tends to cause undesirable diolefin conversion when either or both of the temperature and hydrogen charge rate are relatively high. The vapor hourly space velocity (VHSV) on the basis of volumes of hydrogen vapor (corrected to 60° F. and 760 mm. Hg) charged per hour may desirably range from about 100 up to 900. At greater throughputs, the conversion of $C_4$-acetylenes falls off sharply in some instances, so a space velocity in the range of about 250 to 750 VHSV is usually preferred.

Although the present hydrogenation catalyst is capable of converting more than 99% of the acetylenic hydrocarbon content of a diolefin stream; hydrogenation severity in respect to the instant process may be defined as sufficient to convert at least 90% of the acetylenic hydrocarbons (preferably at least 95% in some instances) into more saturated compounds (i.e., compounds having a lower degree of unsaturation such as diolefins or monoolefins) without the loss by conversion of more than about 1% by weight of the diolefinic material present. When the severity of hydrogenation is too low, the degree of conversion of the acetylenic material is insufficient. When the severity is too high, diolefin losses become excessive; moreover, the diolefin product is diluted by the olefins thus formed in embodiments of the invention where the fractional distillation step precedes rather than follows the hydrogen treatment. Conversions of 95 and 99% of the $C_4$-acetylenes with only 0.5 and 1.0% losses, respectively, of butadiene are obtainable; hence it is generally desirable to adjust the reaction severity to convert about 90 to 99% of the acetylenic hydrocarbons without loss of more than about 0.5 to 1% of the diolefins.

As indicated earlier, reaction temperature, hydrogen: acetylenic hydrocarbon mol ratio and space velocity, all jointly affect the reaction severity; and the same is true of the activity of the catalyst which is determined by its composition and degree of deactivation in service. The hydrogenation severity is controlled here by properly balancing the first three named factors within the aforesaid ranges for each of these reaction conditions. To illustrate this, an inadequate conversion efficiency may be corrected by increasing either or both of the temperature and hydrogen charging rate or by reducing the space velocity within appropriate limits; an excessive diolefin loss may be reduced by decreasing the hydrogen charge rate or the reaction temperature or by increasing the space velocity; compensation for a declining catalyst activity may be made by increasing the reaction temperature, etc. In some instances, two or three of the process variables may be adjusted at the same time; and in other cases, it will be preferable to change only one of these to regulate the severity of hydrogenation, as will be apparent to those skilled in the art. In regulating the severity of hydrogenation by adjusting the temperature, space velocity and hydrogen charging ratio, it will be appreciated that a proper correlation of these conditions is necessary. For example, even within the aforementioned ranges of said conditions, one cannot expect to get good results with each of the three conditions adjusted to its maximum or minimum value within its range. Thus, in hydrogenating hydrocarbon mixtures of the type described over a fresh and highly active catalyst containing palladium on oxidized copper and chromium at a high temperature of 350° F., a high hydrogen:acetylenic hydrocarbon mol ratio of 20:1 and a low space velocity of 100 VHSV, it will be found that an undesirably high loss of butadiene occurs. On the other hand, after the activity of the same catalyst has been substantially reduced by long service, a satisfactory conversion of acetylenic hydrocarbons cannot be expected if the reaction temperature is dropped to a low 100° F. and the hydrogen charging ratio is reduced to a low 2:1 while the space velocity is increased to a high 900 VHSV rate.

In combining the elimination of undesired acetylenic materials from diolefin streams using both hydrogenation and distillation, it is possible to obtain purified products containing less than 20 and even less than 10 p.p.m. of acetylenic contaminants from mixtures containing up to 20,00 p.p.m. of such materials using mild and easily maintained hydrogenation conditions with the processing benefits accuring thereto.

In the fractional distillation operation, the $C_4$-acetylenic material is separated without conversion as a bottom stream using conventional apparatus; and the product may be taken overhead in vapor form or alternatively condensed and removed as a liquid, while lower boiling components of the fractionation charge, such as hydrogen and methylacetylene, may be separated therefrom in gaseous form in instances where the removal of such lighter substances is necessary or desirable. A fairly precise fractionation is usually desirable, since 1,3-butadiene boils at 24° F. under atmospheric pressure and vinylacetylene at 41° F. Accordingly, it is generally preferred to employ a relatively tall fractionating column equipped with about 100 to 200 trays, about 150 trays being preferred for most operations. A column of this type may be operated under an overhead pressure of about 55 to 85 p.s.i.g. A thick layer of insulation around the column is usually desirable; and the bottom is generally maintained at a temperature of about 150 to 200° F., depending on the pressure and bottom product composition, by means of conventional heating media, while the top temperature is maintained between about 110 and 135° F. for overhead removal of the butadiene product. In cases where the excess hydrogen and any methylacetylene are taken overhead, they are removed at a temperature in the range of about 60 to 90° F. and a pressure of about 45 to 75 p.s.i.g.; and the butadiene product is withdrawn at a temperature of about 115 to 140° F. from an intermediate upper tray located at least a few trays below the top tray and above the median tray in number along the length of the column.

For a better understanding of the nature and objects of this invention, reference should be had to the following illustrative example.

*Example 1*

A mixture of predominantly four-carbon hydrocarbons containing 85% by weight of 1,3-butadiene and 5,000 p.p.m. of $C_4$-acetylenes, with the balance consisting mainly of various butenes, is stored under nitrogen at a gauge pressure of about 100 pounds per square inch (p.s.i.g.) to keep the material in liquid phase and also to keep out air. In processing this mixture, it is first vaporized in a heated vessel, then mixed with a stream of hydrogen gas and heated to the process temperature. The resulting hydrogen-hydrocarbon stream is then charged to a closed hydrogenation reactor containing a fresh catalyst composite of ⅛ to ³⁄₁₆ inch particle size prepared as described hereinbefore and containing on a dry weight basis 0.52% of palladium metal, 40.5% copper and 29.3% chromium, the latter two elements being present in oxidized form. A constant average temperature of 150° is maintained in the bed of catalyst pellets by regulating the aforementioned heating of the vapor mixture, and the selective hydrogenation reaction is carried out at atmospheric pressure at a space velocity of 500 VHSV and a molar ratio of hydrogen charged to acetylenic hydrocarbons of 5:1. A 95% conversion of acetylenic material with only a 0.5% butadiene loss takes place in this step; hence the $C_4$-acetylenic content is reduced to approximately 250 p.p.m. The hydrogenated product vapor is introduced into the midsection of a fractionating column containing 150 trays and operating at 70 p.s.i.g. pressure with the top maintained at a temperature of 121° F. Excess hydrogen and some methylacetylene are taken off at the top of the column and recycled to the hydrogenation step. Provision is made also for venting or flaring this overhead stream intermittently in the event of any substantial build-up of its methylacetylene content. Vinylacetylene, ethylacetylene, and other hydrocarbons with boiling points above 1,3-butadiene are withdrawn at the bottom. The loss of 1,3-butadiene in the distillation charge to the overhead and bottom streams amounts to only about 0.2 mol percent.

The product stream is drawn off at tray No. 16 (counting downward from the top tray) with a content of 99.5% 1,3-butadiene and less than 10 p.p.m. of $C_4$-acetylenes. Thus, the overall elimination of acetylenic hydrocarbons amounts to 99.8%, while the overall butadiene loss during purification is less than 1%.

When fractional distillation follows the selective hydrogenation treatment, a highly purified diolefin product is obtainable in which not only the lighter and heavier original constituents of the feed are removed in the overhead and bottoms, respectively, but also practically all of the olefins, such as the various butenes, formed during the hydrogenation are also eliminated from the product. On the other hand, this process sequence exposes the hydrogenation catalyst to any deactivating components in the charge and to a heavy hydrogenation load when the content of acetylenic materials is high.

In cases where a similar fractional distillation takes place prior to the catalytic hydrogenation, a less pure charge stock may be utilized since not only catalyst-deactivating high boiling components but also excessive quantities of acetylenic hydrocarbons are stripped from the material before it is charged to the hydrogenation catalyst bed. Moreover, the vaporizing apparatus may be omitted since the distilled stream of the desired diolefin may be withdrawn overhead in gaseous form as the hydrogenation feed. In this arrangement, the hydrogen recycle is lost and the butadiene product may contain small amounts of butenes formed by catalytic conversion, as well as excess hydrogen.

However, with either processing sequence, the two steps are cumulative in respect to the elimination of acetylenic hydrocarbons, as may be exemplified by the elimination of 90% or more of the original content of acetylenic hydrocarbons in the charge by mild selective hydrogenation at high throughputs followed by a separation of 90% or more of the remaining acetylenes by distillation, thereby leaving less than 1% of the original acetylenes in the original product.

It is also contemplated that fractional distillation both before and after the selective hydrogenation reaction may be employed in some instances where it may be desirable to obtain a diolefin product of extreme purity from a heavily contaminated raw material.

While the process of the present invention has been illustrated by the disclosure of specific operating conditions and the treatment of certain specific charge stocks in considerable detail, it will be apparent to those skilled in the art that many other embodiments and modifications of such processing fall within the purview of this invention. Accordingly, the present invention should not

We claim:

1. A process which comprises purifying a hydrocarbon mixture containing a substantial proportion of 1,3-butadiene and less than about 2% by weight of acetylenic material containing 4 carbon atoms per molecule by steps comprising selectively hydrogenating the mixture in the vapor phase under mild reaction conditions in the presence of hydrogen and a catalyst to hydrogenate about 90 to 99% by weight of said acetylenic material by at least partial saturation of the triple bond contained therein while retaining at least about 99.5% of said 1,3-butadiene in the hydrogenation charge; said reaction conditions including a temperature within the range of about 100 to 350° F., a molar charging ratio of hydrogen to acetylenic material within the range of about 2:1 to 20:1, and a volumetric hourly vapor space velocity within the range of about 100 to 900; said catalyst comprising about 0.01 to 5% by weight of palladium on an oxidized copper and chromium base material having a weight ratio of combined copper to combined chromium between about 22:78 and 73:27, respectively, on a metal basis; and fractionally distilling the hydrogenation product to eliminate at least about 90% of the remaining acetylenic material to produce a purified 1,3-butadiene product stream containing at least about 99.5% of the 1,3-butadiene in the distillation charge and containing less than 20 parts per million of said acetylene material; and removing the acetylenic material eliminated from the distillation charge in a separate higher boiling stream of liquid distillation residue.

2. A process which comprises purifying a hydrocarbon mixture containing a substantial proportion of 1,3-butadiene and less than about 2% by weight of acetylenic material containing 4 carbon atoms per molecule by steps comprising selectively hydrogenating the mixture in the vapor phase under mild reaction conditions in the presence of hydrogen and a catalyst to hydrogenate at least about 95% by weight of said acetylenic material by at least partial saturation of the triple bond contained therein while retaining at least about 99% of said 1,3-butadiene in the hydrogenation charge; said reaction conditions including a temperature within the range of about 125 to 250° F., a molar charging ratio of hydrogen to acetylenic material within the range of about 4:1 to 12:1, and a volumetric hourly vapor space velocity within the range of about 250 to 750; said catalyst comprising about 0.1 to 1% by weight of palladium on an oxidized copper and chromium base material having a weight ratio of combined copper to combined chromium between about 22:78 and 73:27, respectively, on a metal basis; and fractionally distilling the hydrogenation product in a fractionating column in the substantial absence of extraneous reagents and extraction solvents to eliminate at least about 90% of the remaining acetylenic material to produce a purified 1,3-butadiene product stream containing at least about 99.5% of the 1,3-butadiene in the distillation charge and containing less than 10 parts per million of said acetylenic material, the amount of 1,3-butadiene in the product stream being at least about 99% by weight; and removing the acetylenic material eliminated from the distillation charge in a separate higher boiling stream of liquid distillation residue.

References Cited
UNITED STATES PATENTS

| | | | |
|---|---|---|---|
| 3,000,794 | 9/1961 | Tchopp | 260—681.5 X |
| 3,003,008 | 10/1961 | Fleming et al. | 260—677 |
| 3,070,641 | 12/1962 | Herndon et al. | 260—681.5 |
| 3,076,858 | 2/1963 | Frevel et al. | 260—681.5 X |
| 3,091,654 | 5/1963 | Kestner | 260—681.5 |
| 3,200,167 | 8/1965 | Reich | 260—681.5 |
| 3,218,268 | 10/1965 | Arnold | 260—681.5 |
| 3,230,157 | 1/1966 | Hill et al. | 260—681.5 |
| 3,274,256 | 9/1966 | Reich | 260—681.5 |

OTHER REFERENCES

Meyer and Burwell: "The Reaction Between Deuterium and 1-Butyne, 1,2-Butadiene, and 1,3-Butadiene on Pd-on-Alumina Catalyst," J. Am. Chem. Soc. 85, 2881–7 (October 1963).

DELBERT E. GANTZ, *Primary Examiner.*

G. E. SCHMITKONS, *Assistant Examiner.*